John J. Gordon
Bag Tie.
PATENTED DEC 3 1867
71739
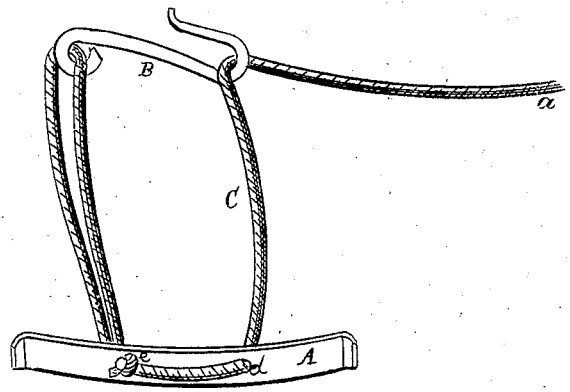
Witnesses
Inventor

United States Patent Office.

JOHN J. GORDON, OF FLINT, MICHIGAN.

Letters Patent No. 71,739, dated December 3, 1867.

---

IMPROVEMENT IN BAG-TIES.

---

The Schedule referred to in these Letters Patent and making part of the same.

---

TO ALL WHOM IT MAY CONCERN:

Be it known that I, JOHN J. GORDON, of Flint, in the county of Genesee, and in the State of Michigan, have invented certain new and useful Improvements in Bag-Ties; and do hereby declare that the following is a full, clear, and exact description thereof, reference being had to the accompanying drawings, and to the letters of reference marked thereon.

In the annexed drawings, making part of this specification, A A represent a small bar or elongated button, made either of wood or of metal, and provided near its centre with two openings, at $e$ and $d$. B represents a metallic hook, with an eye in one end. C represents a cord, which is doubled at one end, and passed through the opening at $e$, in the bar A, the loop formed being caught in the eye of hook B. A knot is formed at the opening $e$, in such a manner as to allow the looped end to draw, to lessen or enlarge the loop. The other end of the cord C is passed through hole $d$, and then caught over the hooked end of hook B. The bag-mouth is caught between the hook and bar, and the opening between the cords, and the end $a$ of the cord being drawn up through the hooked end of the hook as tightly as possible, is fastened by crossing it backwards and forwards around and over the ends of the bar A a sufficient number of times. This forms a very secure fastening, and one which can be used with great facility.

What I claim as new, and desire to secure by Letters Patent, is—

The bar A, hook B, and cord C, constructed, combined, and used substantially as and for the purpose set forth.

In testimony that I claim the foregoing, I have hereunto set my hand, this     day of    , 1867.

JOHN J. GORDON.

Witnesses:
    JOHN M. DECKER,
    JAMES DECKER.